Patented June 22, 1954

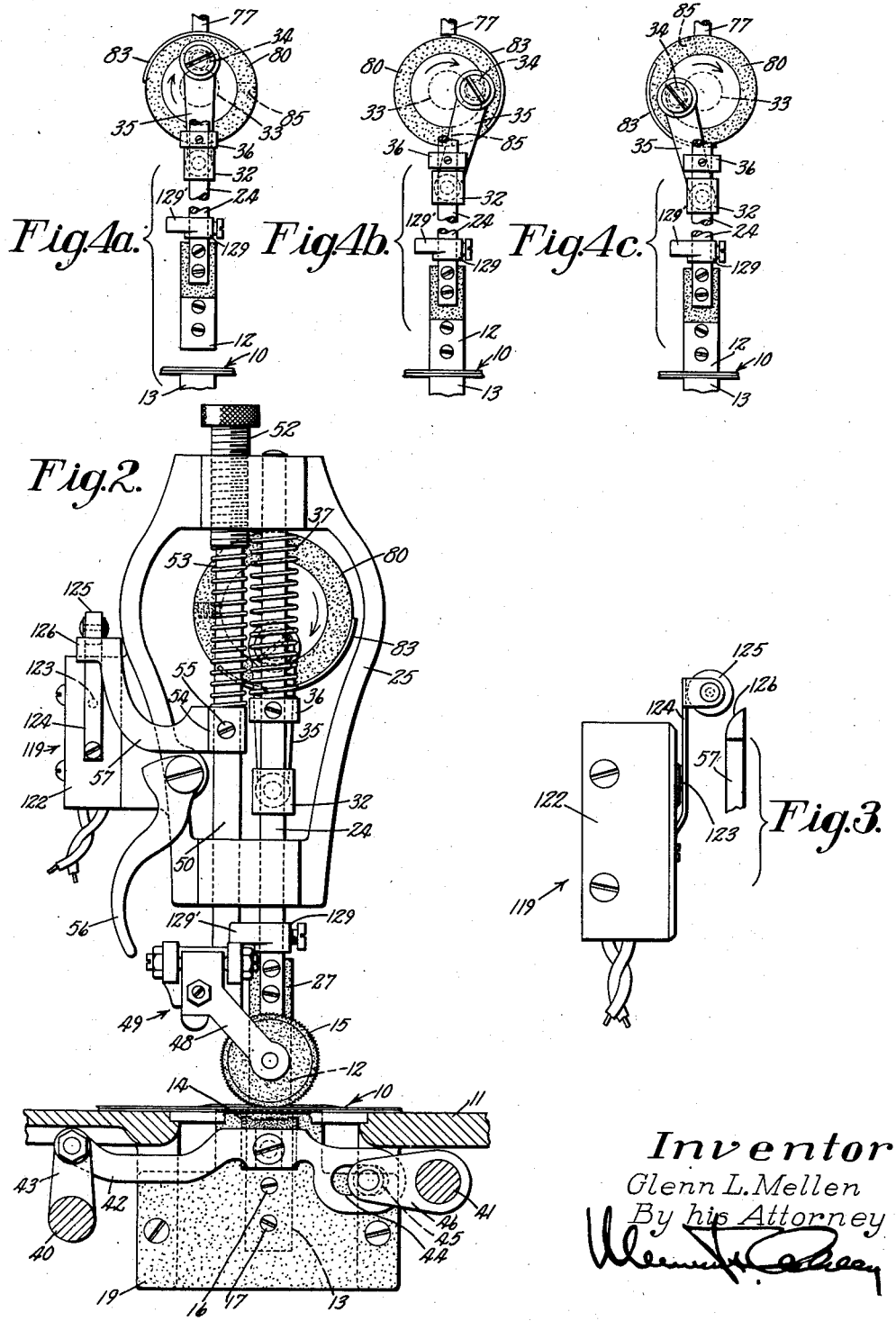

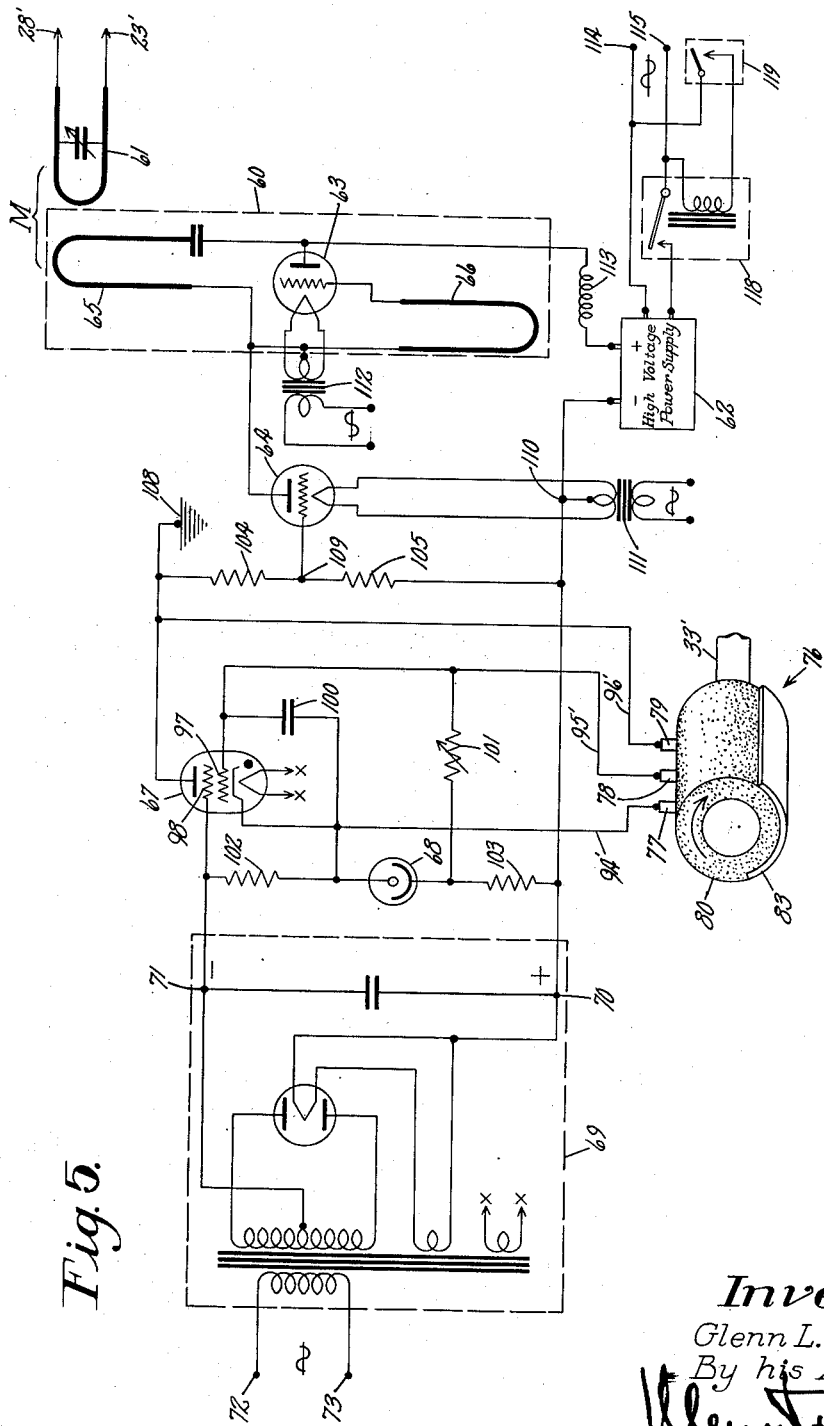

2,681,976

UNITED STATES PATENT OFFICE 2,681,976

ARRANGEMENT FOR PROGRESSIVE TREATMENT WITH PULSED ELECTRICAL ENERGY

Glenn L. Mellen, Brookline, Mass., assignor to United Shoe Machinery Corporation, Flemington, N. J., a corporation of New Jersey Application July 16, 1946, Serial No. 684,057

4 Claims. (Cl. 219—10.69)

This invention relates to apparatus for progressively bonding workpieces by the application thereto of electrical energy in the form of a high-frequency field utilized to produce a heating effect in the work. More specifically, the invention relates to reciprocatory electrode type apparatus for progressively bonding pieces of material comprising thermoactive materials or pieces of material coated with thermoactive adhesives by the application thereto of high-frequency electric fields.

The utility of high-frequency dielectric bonding is well known in, for example, the manufacture of water-proof bags and similar articles from plastic sheet material, or in the manufacture of leather articles with the aid of thermoactive cements. Such bonding has been accomplished by passing the work parts between reciprocatory or roller electrodes continuously energized by a high-frequency oscillator. Where the electrodes are continuously energized, the speed of the work feed must be maintained constant for a given work thickness if uniformity of heating of the seam path, and hence uniformity of the bond character, is to be maintained. If the feed speed is slowed from the speed at which a satisfactory bond is produced, the work may overheat and burn, and because of this an operator is not free to slow down on curves as he might like to do.

A further difficulty which appears with reciprocatory electrode machines where the electrode is continuously supplied with high-frequency electric energy is a tendency for an arc to form between the electrode and the work when the electrode is lifted.

It is an object of the invention to provide a dielectric progressive bonding machine of the reciprocatory electrode type in which such difficulties are not present.

To this end and in accordance with a feature of the invention, there is provided a machine of the aforesaid type having means for controlling the supply of energy to the electrode whereby such energy may be supplied to the electrodes in a pulse interval of predetermined duration commencing after the electrodes have engaged the work and terminating before the electrodes are disengaged from the work. By adjusting the duration of each pulse interval or the voltage supplied to the electrodes, the power dissipated in the work during each "stitch" may be made just sufficient for bonding each stitch along the seam to be formed between the work parts. Assuming an adequate source of high-frequency electric energy, this pulse interval may be much shorter than the period of engagement between the electrodes and the work between each stitch, and accordingly not only is the rate of supply of high-frequency electric energy automatically adjusted to the rate of feed so that an operator may adjust the feed speed to suit himself, but since the power is shut off before the electrode is lifted no arcing can take place between the electrode and the work at that time.

Furthermore a totally new, different, and unexpected result is obtained by providing a machine of the reciprocatory electrode type with pulse timing means which cuts off the high-frequency electric energy before the electrode is lifted from the work. Where the high-frequency energy is applied for a time interval beginning shortly after the electrode engages the work and terminating prior to the lifting of the electrode, a portion of the electrode engagement period becomes available as a "dwell period" wherein the bond may cool under pressure of the electrode to enhance the quality of the bond.

Accordingly another object of the invention is the provision of a dielectric progressive bonding machine of the reciprocatory electrode type in which a "dwell period" may be provided for each stitch before the electrode pressure is released.

An illustrated embodiment of such a machine provides an arrangement for progressively bonding work pieces by the application of pulses of high-frequency electric energy and of predetermined length to incremental areas thereof. By timing the application of the pulses in relation to the work feed movement, the energy applied to each incremental area is maintained constant throughout a wide range of work speed to provide uniform bonding with variable work speed. As illustrated, a switch actuated in timed relation with the work feed mechanism (and hence with the feed movement of the work) initiates the operation of a controlling circuit which then pulses for a predetermined interval a high-frequency oscillator supplying energy to the electrodes, the cycle recurring with further movement of the work. Provision is made for the adjustment of the length of the high-frequency energy pulses to suit the requirements of the work, as aforesaid. Once an adjustment is made it may thereafter remain constant despite wide variations in operating speed of the machine which will operate successfully at all speeds from zero speed to the fastest speed provided for. This independent control of pulse length, and consequently of the high-frequency electric energy delivered to the work is an important feature of the invention.

The above and other features of the invention including various novel details of construction and combinations of parts, mechanical and electrical, will now be more particularly described with reference to the accompanying drawings and will thereafter be pointed out in the claims.

In the drawings,

Fig. 2 is an end view of the same end of the machine;

Fig. 3 is a detailed back view of a switch arranged to turn off the high-frequency power circuits as the upper electrode and presser wheel are lifted manually from the work;

Figure 1:
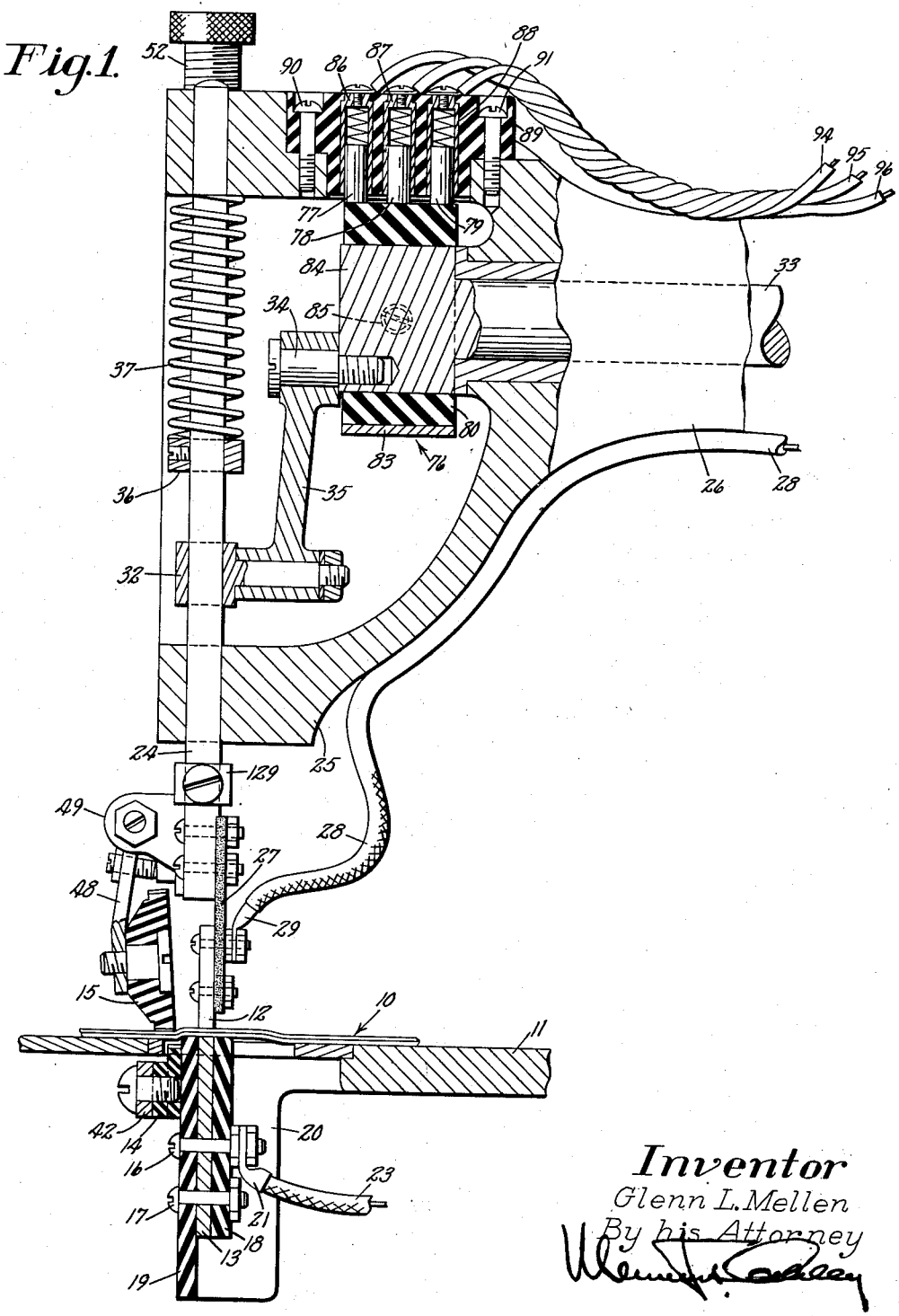
Fig. 1 is a vertical section through the forward or operating end of the machine at right angles to the direction of feed, principally illustrating the arrangement of the electrodes, the work feed mechanism and the electrical switching devices employed.

Figs. 4a, 4b and 4c comprise three different views principally illustrating the relationship of the upper electrode with respect to the work and with a rotary switch in different typical operating positions of these members during their respective movements; and Fig. 5 is a schematic diagram of the electrical circuits employed, including a high-frequency oscillator and a control circuit for operating the oscillator.

In Figs. 1 and 2 the work 10 to be operated upon may be placed upon a table or base plate 11 of the machine in the same manner as in the case of a conventional sewing machine. The specific portion of the work 10 to be operated upon, such as the starting point of the seam, is brought into position adjacent a vertically reciprocative upper electrode 12 and a stationary lower electrode 13 preparatory to feeding the work between them. The work 10 is given an intermittent translatory motion between the electrodes 12, 13 by means of a work feed mechanism comprising a feed dog 14 assisted from above in its engagement of the work by pressure of a serrated presser wheel 15. The relative action between the feed dog 14 and the upper electrode 12 is such that the upper electrode 12 reciprocates up and down in timed relation with the feeding movement of the feed dog 14 and hence with the intermittent movement of the work. The work moves only during the time the upper electrode is lifted free of the work.

The lower electrode 13 is rigidly held by bolts 16 and 17 between two slabs 18, 19 of insulating material, the latter slab being bolted to a bracket member 20 projecting downwardly from the table 11 of the machine. At their upper ends the electrode 13 and the slabs 18 and 19 combine to present a smooth, flat work-engaging surface which may be either flush with, or, as is shown, may be slightly higher than the top of the base member 11. The work slides smoothly over this surface. As to their materials of construction, the electrode 13 may be of copper and the insulating slabs 18 and 19 may be of Mycalex or some other suitable dielectric material such as Bakelite. High-frequency electrical power is conducted to the electrode 13 by means of an insulated wire 23 terminating in a connecting lug 21 held by a nut on the bolt 16 which makes electrical contact with the electrode 13.

The upper insulated electrode 12 directly above the electrode 13 receives its reciprocating motion from a reciprocative rod 24 which is arranged to slide vertically in upper and lower guide holes through top and bottom sections of a recessed head 25 integral with a goose neck 26, the latter two members forming part of the frame of the machine. The electrode 12 is connected by bolts to an insulating piece 27 which is in turn bolted to the rod 24. High-frequency electrical power is conducted to the electrode 12 through the insulated wire conductor 28 bolted by means of a lug 29 to the electrode 12. Both electrodes are conveniently of rectangular cross-section and are preferably of the same shape and size at their work-engaging faces.

Vertical movement is imparted to the rod 24 and electrode 12 through the action of a sliding cross-head 32 driven through an overhead shaft 33 and a crank-pin 34. The rod 24 is lifted by the cross-head only at a time when the latter in its rising movement comes into contact with a fixed collar 36 on the rod 24. At this instant the electrode 12 which normally is pressed against the work through the compressive force of a spring 37, is lifted from the work and remains lifted for a short period of time, during which time the work is engaged by the feed dog 14 and is advanced an incremental amount, placing between the electrodes a new area to be operated upon next. The purpose of the spring is twofold. Not only does it maintain substantially constant electrode pressure against the work but also it cooperates with the sliding cross-head 32, the fixed collar 36, the rod 24 and other elements in providing for a relatively large "duty cycle." For present purposes "duty cycle" may be defined as the ratio of the period of time during which the electrodes are in engagement with the work to the period of time during which the upper electrode 12 has been separated from the work. It is to be understood that a larger duty cycle provides a greater period of useful time during which the work may be heated and that this permits an advantageous reduction in the power required from the oscillator. This will be more fully appreciated as the description proceeds.

The feed dog 14, carried by a bar 42, is substantially the counterpart of that of a conventional sewing machine. It derives its feeding motion from a pair of shafts 40 and 41 the first of which, through a crank 43, provides the feed dog with translatory motion and the second of which, through a crank 46, provides a motion whereby the dog is intermittently lifted into contact with the work and away from the work. The crank 43 is pin connected to the bar 42 whereas the crank 46 carries a pin 45 which engages a slot 44 in the bar 42. To prevent possible arc-over between the lower electrode 13 and the feed dog the latter may be constructed of insulating material such as hard rubber or Bakelite.

Cooperating with the feed dog, the freely rotatable, serrated presser wheel 15 bears constantly against the upper surface of the work 10, the work rolling by the presser wheel as the feed dog 14 becomes effective in giving the work motion. The presser wheel 15 and supporting structure is likewise conventional as being similar to that of a well-known type of sewing machine. It is carried by a swinging arm 48 pivotally mounted in an assembly 49 which is fixed to the lower end of a vertical rod 50 (Fig. 2). By this means the wheel 15 may be swung upwardly from the base 11 and away from the head 25 without lifting the rod 50. The wheel 15 is urged continually against the work by the downward force of a spring 53 retained on the upper part of the rod 50 between a spring adjustment collar 52 and a collar 54 fixed on the rod 50 by a set screw 55. The wheel 15 may also be lifted manually by a hand lever 56 which bears against an arm 57 projecting outwardly from the collar 54.

With further reference to the similarity between various of the component parts and combinations of the present machine to those of a conventional sewing machine it is to be noted that the shafts 33, 40 and 41 receive their motion from means (not shown) which are similar to those of a conventional sewing machine, which usually includes a foot-operated rheostat for governing speed of operation in addition to an electric motor and drive mechanism for the shafts.

Having described the arrangement and construction of the electrodes, the work feeding members and the means by which movement is imparted to such members, reference may now be had to the electrical circuits for supplying high-frequency power to said electrodes.

In Fig. 5, a high-frequency oscillator circuit 60, which conveniently is of the tuned grid, tuned plate type, is arranged to deliver, under the control of a switch-actuated controlling circuit, pulses of high-frequency power to a tuned output coupling loop 61 matched to the load and having terminal connections 23' and 28' to which the insulated conductors 23 and 28 (Fig. 1) are connected. A conventional high voltage power supply 62, which is energized through a line current relay 118 actuated by a contact type control switch 119, provides current to an oscillator tube 63 through the series circuit including a modulator tube 64, the latter being adapted to render the oscillator operative or inoperative in accordance with modulation control voltages applied to the control grid of the latter tube. Such voltages, in the form of pulses, are generated in a switch-actuated timing circuit including a gaseous discharge tube 67 and a voltage regulator tube 68. The oscillator embodies the tuned circuits 65 and 66 connected in the usual manner. The timing circuit is supplied with current from a conventional low voltage power supply 69 having output terminals 70 and 71, positive and negative respectively, and input terminals 72 and 73. The construction and operation of the timing circuit is such that a voltage pulse of predetermined time duration is delivered to the control grid of the modulator tube 64 each time a rotary switch or commutator 76 reaches a predetermined angular position with respect to the contact brushes 77, 78 and 79 which are alined axially of a shaft 33' by which the switch 76 is rotated. The switch comprises a cylinder 80 of insulating material around a portion of the outer periphery of which is embedded a conductive segment 83 which produces a short circuit between the brushes 77, 78 and 79 each time it passes beneath them. At all other times there is an open circuit between the brushes insofar as the effect of the switch is concerned.

The mechanical construction and location of the switch 76 with respect to the machine may be observed by further reference to Fig. 1 in particular. The insulating cylindrical member 80 is retained on an enlarged end portion 84 of the shaft 33 and is held in position by a countersunk screw 85 which is arranged so as to provide no appreciable interference with the brushes 77, 78 and 79. The brushes are retained in tubular members 86, 87 and 88 retained in an insulating block 89 which is held to the head 25 by a pair of screws 90 and 91. Each brush and tube assembly is provided with an internal spring for urging the brushes into good electrical contact with the rotatable switch member 76. The brushes are connected in the timing circuit by means of the insulated conductors 94, 95 and 96 shown in Fig. 5 as 94', 95' and 96' respectively.

The gas tube 67 (Fig. 5) has a first control grid 97 and a second control grid 98 in addition to the usual cathode and anode. Associated with the first control grid is a variable-bias circuit comprising a condenser 100, a variable resistor 101 and the voltage regulator tube 68, arranged in series connection, with the condenser connected between the said first control grid and the cathode. The second control grid 98 receives its bias from a fixed bias circuit comprising a resistor 102, the voltage drop in which represents the bias voltage. The resistor 102 is connected in a series network comprising the voltage regulator tube 68 and a voltage dropping resistor 103, which network is connected across the terminals 70 and 71 of the low voltage power supply 69.

The plate circuit of tube 67, during the time the brushes 77, 78 and 79 are open-circuited, is through series resistors 104 and 105, and through the power supply and resistor 102. The anode of tube 67 is connected to ground at point 108 while the control grid of the modulator tube 64 is connected to point 109 between the resistors 104 and 105. As will become more apparent, the voltage drop in resistor 105 caused by variations in the plate current of tube 67 produces voltages at the control grid of tube 64 which create amplitude modulating effects on the operation of the oscillator 60. The lower end of resistor 105, the negative terminal of the high voltage power supply, the positive terminal 70 of the low voltage power supply and the cathode of tube 64 are shown connected together. The cathode connection to tube 64 is at point 110 in the circuit, which is a mid tap on the secondary winding of a filament transformer 111 for the tube 64.

Filament voltage is supplied to the oscillator tube 63 through a filament transformer 112. Connected in the plate circuit of the oscillator between the positive terminal of the power supply 62 and the plate connection for the tube 63, a radio frequency choke 113 isolates the power supply 62 from the radio frequency energy generated in the oscillator.

In the operation of the timing circuit, the combined effect of the bias voltages applied to the first and second control grids of tube 67 is such that the tube is normally conductive, representative of the open circuit condition at the brushes 77, 78 and 79. In this condition the effect of the negative bias voltage appearing across resistor 102 in tending to produce non-conduction in the tube 67 is overcome by the positive bias voltage appearing across the energy storing condenser 100 which is normally charged to the constant voltage at the terminals of the voltage regulator tube 68. Plate current therefore normally flows in tube 67 in a circuit from terminal 70 of the power supply 69 through the resistor 105, the resistor 104, the tube 67 and the resistor 102 to terminal 71 of the power supply and this plate current is of such magnitude as to bias off tube 64 by the voltage drop across resistor 105. The effect is to render the oscillator 60 inoperative.

The timing circuit changes condition upon short-circuiting the brushes 77, 78 and 79. At this instant of time the condenser 100 is immediately discharged and the gaseous discharge in the tube 67 becomes extinguished because of the short circuit across its anode and cathode elements. During this condition current continues to flow through the resistor 105 thereby maintaining the negative bias at the grid of modulator tube 64, but the circuit for this current now comprises the series connected elements including the resistor 105, the resistor 104, the wire 96', the switch, the wire 94', the resistor 102 and the power supply. It will be apparent that the oscillator 60 is also inoperative during this condition, which may be termed as the pre-pulse condition, and it remains inoperative until the conductive segment 83 of the switch 76 leaves the brushes 77, 78 and 79 and re-establishes the original open circuit at the brushes.

At the instant the open circuit condition is re-established, the normal flow of current through resistor 105 is interrupted thus rendering the modulator tube 64 conductive and the oscillator 60 operative. Simultaneously the operation of the timing circuit is initiated as condenser 100 begins to charge. This constitutes the beginning of the high-frequency power pulse appearing at the output terminals 23' and 28' of the oscillator. This power pulse lasts for a predetermined length of time dependent primarily upon the adjustment of the variable resistor 101 which determines the length of time for the condenser 100 to become recharged from the voltage drop across the voltage regulator tube 68 with a positive bias voltage adequate to overcome the effect upon the gas tube 67 of the fixed negative bias voltage across resistor 102. When the critical firing voltage for the gas tube is reached across the terminals of condenser 100, plate current is re-established in the tube 67 and consequently in resistor 105, thereby terminating the pulse.

In the adjustment of resistor 101, which may be made on a graduated scale (not shown) and in accordance with the requirements of the work to be operated upon, consideration is given to the fastest operating speed for which the machine is designed and the pulse is ordinarily adjusted to correspond in length to a period of time equal to or less than the tenure of the open circuit condition at the brushes 77, 78 and 79 for that speed. It will be apparent that the pulse length can in no event exceed the tenure of the open circuit condition; and it will be understood in passing that the length of the pulse remains constant throughout variations in speed so long as such speed does not exceed that at which said tenure is less than the pulse length. Such time the switch 76 turns one revolution, which corresponds to one operating cycle of the electrodes and work feed mechanism of the machine, the pulsing circuit or control circuit including the timing circuit and modulator tube causes the oscillator 60 to deliver a pulse of high-frequency energy to the work via the electrodes. It will be understood that if the feeding means ceases to operate, no further pulses will be delivered to the electrodes, and the supply of electric energy to the electrodes will be thus reduced to an ineffective level.

In Figs. 4a, 4b and 4c, respectively, representative positional relationships are shown principally between the upper reciprocative electrode 12 with respect to the work and with respect to the rotary switch 76, the crank pin 34, the pitman 35, the cross-head 32 and the fixed collar 36. In Fig. 4a the upper electrode is at its maximum point of travel from the work and the brushes 77, 78 and 79 are short-circuited by the conductive segment 83, a condition wherein no power is delivered to the electrodes. In Fig. 4b the upper electrode has just descended upon the work and the conductive segment 83 is about to pass from beneath the brushes 77, 78 and 79 which, when it occurs, will mark the initiation time of the pulse of high-frequency energy to the electrodes; whereas, Fig. 4c represents a condition wherein the pulse may be about to terminate. However, in the latter figure, it will be understood that the operating speed of the machine will necessarily determine the position of the members when the pulse terminates, and in the positions of the members shown therein the speed is desirably less than the maximum speed for which the machine is designed.

For the sake of safety to the operator, a power control switch 119 (Figs. 2 and 3) is provided to turn off the high voltage power when the operator manually lifts the cam lever 56. Then the presser wheel 15 and the upper electrode 12 rise together from the work, and this action may, for instance, be at a time when it is desired to reposition the work beneath the electrode and presser wheel. The lifting of the electrode rod 24 is effected by engagement of the presser wheel assembly 49 beneath a projecting shoulder 129' on a collar 129 held on the rod 24 by a set screw. As shown in Fig. 5 the switch 119 is arranged to operate the line current relay 118 to accomplish the foregoing purpose. Switch 119 includes a switch box 122 mounted by screws on the side of the head 25, and a switch actuating contact plunger 123 engaged by a lever 124. The details of the construction of the switch will be apparent in Fig. 3, and it will be recognized as being of the type commonly known as "microswitch." The upper end of the actuating lever 124 carries a roller 125 which is arranged for engagement with a finger 126 carried at the outer end of the arm 57 (Fig. 2). As the operator lifts the cam lever 56 the finger 126 is raised into engagement with the wheel 125 thereby forcing the lever 124 against the plunger 123, depressing the latter and operating the switch to open the relay 118. Depressing the plunger 123 of the switch 119 interrupts the current in the field coil of the relay 118 thereby breaking the line circuit to the high voltage power supply and de-energizing the entire high voltage system. When the cam lever 56 is again lowered by the operator the plunger 123 re-extends with the aid of an internal spring contained within the switch box 122, thus restoring line voltage to the said high voltage power supply 62.

It will be apparent that the upper electrode remains against the work for a period of time following each pulse of energy delivered to the work, and that this effect is of benefit in speeding up the cooling of the heated area by the removal of heat by conduction. Moreover, the strength of the bond is assured by allowing it to cool to a certain extent, at least, while under pressure from the electrodes. The effect may obviously be increased by increasing the length of the period of time referred to, as, for instance, by increasing the instantaneous pulse power and shortening the pulse length proportionately. In some instances it may be desirable to slow down the operation of the machine to achieve the same result, although this latter may not be necessary in most applications where the oscillator power is adequate.

Having thus described my invention, what I claim as new and desire to secure by Letters Patent of the United States is:

1. In a progressive bonding machine, an intermittent feed mechanism variable in speed from zero to a fixed limit, a stationary electrode beneath the work, an upper electrode mounted for movement above the work toward and away therefrom, mechanism for moving said upper electrode in operating cycles by intermittently lifting said upper electrode and then returning it into engagement with the work, an oscillator, a control circuit therefor including a pulse timing circuit and a commutator for actuating said control circuit synchronously with the electrode moving mechanism for controlling said oscillator to supply a single pulse of a predetermined length to said electrodes each time the upper electrode is moved into engagement with the work, said pulses being maintained constant in length by said timing circuit throughout changes in the frequency of the operating cycles of said upper electrode.

2. In a dielectric bonding machine for progressively forming a seam to join contiguous sheets of thermoplastic material, electrodes between which the sheets are interposed, means for feeding the sheets intermittently past the electrodes, means for cyclically moving one of said electrodes toward and away from another of said electrodes, a high-frequency oscillator connected to said electrodes, a modulator circuit connected to control the oscillator to provide a pulse of high-frequency electric energy of predetermined time duration each time the operation of said modulator circuit is initiated, and a switching device synchronized with the movement of said one electrode for initiating the operation of the modulator circuit at a predetermined point in the cycle of electrode movement.

3. In a dielectric progressive bonding machine having a pair of electrodes one of which is mounted for movement toward and away from the other, means for feeding work parts intermittently between the electrodes, means for reciprocating said one electrode in a cycle of movement, and means for supplying high-frequency electric energy to the electrodes, the improvement which comprises the combination with the above recited elements of a timing control circuit connected to control the admission of high-frequency electric energy to the electrodes, said circuit being arranged, upon initiation, to admit such energy to the electrodes for an interval of predetermined duration and including means for adjusting said interval to make it shorter than the interval during which said one electrode engages the work, and initiating means operatively associated with said one electrode and connecting with the timing circuit to initiate the operation of said circuit at a predetermined point in the cycle of electrode movement.

4. In dielectric bonding apparatus having a pair of electrodes, driving means for moving one of said electrodes toward and away from the other to cause the electrodes to clamp work parts intermittently and means for intermittently feeding the work parts past the electrodes, the combination of a high-frequency, constant pulse-length, electrical pulse generator, means for applying the output of the said generator to said electrodes, and triggering means for said generator whereby pulse initiation is effected, said driving means being connected with said triggering means to operate said triggering means once each time the electrodes clamp the work parts.

References Cited in the file of this patent

UNITED STATES PATENTS

| Number | Name | Date |
|---|---|---|
| 1,438,867 | Schroder | Dec. 12, 1922 |
| 1,640,244 | McBerty | Aug. 23, 1927 |
| 2,276,994 | Milinowski | Mar. 17, 1942 |
| 2,391,086 | Crandell | Dec. 18, 1945 |
| 2,394,004 | Odquist | Feb. 5, 1946 |
| 2,401,991 | Walton | June 11, 1946 |
| 2,432,412 | Hacklander | Dec. 9, 1947 |
| 2,434,325 | Le Vesconte | Jan. 13, 1948 |
| 2,434,330 | Merz | Jan. 13, 1948 |
| 2,438,498 | Geist | Mar. 30, 1948 |
| 2,439,918 | Auxier | Apr. 20, 1948 |
| 2,446,623 | Welch | Aug. 10, 1948 |
| 2,467,133 | Irons | Apr. 12, 1949 |
| 2,473,143 | Graham et al. | June 14, 1949 |
| 2,477,040 | Brown et al. | July 26, 1949 |
| 2,485,395 | Lord | Oct. 18, 1949 |

OTHER REFERENCES

Wireless World, January 1945, page 29 (Photostat in Div. 60).